United States Patent [19]

Fleischer et al.

[11] Patent Number: 5,496,916
[45] Date of Patent: Mar. 5, 1996

[54] PROCESS FOR OXIDIZING POLYARYLENE COMPOUNDS CONTAINING THIOETHER GROUPS

[75] Inventors: Dietrich Fleischer, Darmstadt; Heinz Strutz, Usingen; Jürgen Kulpe, Frankfurt am Main; Andreas Schleicher, Einhausen, all of Germany

[73] Assignee: Hoechst Aktiengesellschaft, Germany

[21] Appl. No.: 237,272

[22] Filed: May 3, 1994

[30] Foreign Application Priority Data

May 4, 1993 [DE] Germany ............... 43 14 738.0

[51] Int. Cl.⁶ ................ C08G 75/00; C08F 6/00
[52] U.S. Cl. ............ 528/373; 528/388; 528/480; 528/486; 528/489
[58] Field of Search ................ 528/322, 323, 528/373, 388, 480, 486, 487, 489, 491

[56] References Cited

U.S. PATENT DOCUMENTS 3,948,865  4/1976  Brady et al. ............... 528/388
4,563,509  1/1986  Liang ............... 525/537

FOREIGN PATENT DOCUMENTS 1938806   2/1970  Germany .
63-210130 8/1988  Japan .
1234008   6/1971  United Kingdom .
1365486   9/1974  United Kingdom .

OTHER PUBLICATIONS

Chemical Abstracts, vol. 80, No. 24, Jun. 17, 1974, abstract No. 134087u, p. 19.
Kobunshi Ronbunshu (Japanese Polymer Science and Technology) vol. 37, Nr. 6, 1980, pp. 445–448.
Gabler et al, Chimia 28 (1974) p. 567.

Primary Examiner—Shelley A. Dodson
Attorney, Agent, or Firm—Connolly & Hutz

[57] ABSTRACT

Process for preparing a polyarylene sulfone by oxidizing a polyarylene thioether in acetic acid with hydrogen peroxide, the reaction being carried out in the presence of catalytic amounts of concentrated sulfuric acid and/or with the addition of equilibrium per-acids. The reaction products are suitable for producing molded parts having high temperature resistance and high resistance to chemicals.

15 Claims, No Drawings

PROCESS FOR OXIDIZING POLYARYLENE COMPOUNDS CONTAINING THIOETHER GROUPS

The invention relates to a process for preparing polymeric arylene sulfones by oxidation of thioether groups of polymeric, sulfur-containing arylene compounds and also use thereof.

Polyarylene sulfides have been known for some time. The amorphous representatives of this class, for example polyphenylene sulfide sulfone ($PPSSO_2$) have, like the partially crystalline polyarylene sulfides, for example polyphenylene sulfide (PPS), high heat distortion temperature and good resistance to chemicals. However, some applications have even higher requirements. A known method of improving the heat distortion temperature and the resistance to chemicals of polyarylene sulfides is the described oxidation with hydrogen peroxide in concentrated sulfuric acid to give the corresponding polyarylene sulfones (GB-A 1 365 486, DE-A 1 938 806). Disadvantages of the process are on the one hand the acid attack of the strong mineral acid on the thioether bond, and also the possibility of an electrophilic addition, the formation of inhomogeneous products and furthermore the aggressive nature of the sulfuric acid.

Besides the use of hydrogen peroxide in concentrated sulfuric acid in the oxidation of polyarylene thioethers, the use of a hydrogen peroxide/acetic acid mixture for oxidizing aromatic polythioethers containing sulfone groups has also been described (Gabler et. al. Chimia, 28(1974), 567). However, these processes are associated with a large use of suspension media and high temperatures. In addition, only polymers having low molecular weight are used for the preparation.

Polyphenylene oxide sulfides are also converted with acid hydrogen peroxide into the corresponding polyphenylene ether sulfone, likewise in acetic acid (JP-Sho 63-210130), both the starting material and also the product dissolving in the given solvent in this process (homogeneous oxidation). However, many polyarylene sulfides are only sparingly soluble or soluble only at high temperatures in organic and/or inorganic solvents.

It is therefore an object of the invention to avoid the disadvantages of the known processes and also to use higher molecular weight polymers as starting material.

The invention provides a process for preparing a polyarylene sulfone by oxidizing a polyarylene thioether, which comprises carrying out the reaction a) in acetic acid using hydrogen peroxide in the presence of catalytic amounts of concentrated sulfuric acid and/or b) in acetic acid with addition of equilibriumper-acids.

It has been found that the oxidation of a polyarylene thioether by active oxygen using peracetic acid leads completely to the corresponding polyarylene sulfones in a short time. This is surprising, since the partially crystalline starting polymer is insoluble or only slightly soluble in the reaction solution and is thus present as a solid during the reaction. It is unimportant to the success of the reaction whether the percarboxylic acid used has been prepared in a known manner by establishment of equilibrium prior to the reaction and is used in this form, or is only generated in a suitable solvent in which the polymer is suspended. This can occur, for example, by addition of hydrogen peroxide to a carboxylic acid such as acetic acid, with or without the addition of a catalyst accelerating the establishment of equilibrium, for example sulfuric acid. It is also possible to take up the percarboxylic acid, prepared for example by establishment of equilibrium, in an organic solvent such as dichloromethane. Another advantage of the present process is the considerably smaller use of suspension medium in comparison with the prior art.

Polymers which can be used are linear and branched polyarylene systems comprising the recurring unit of the formula I, which comprise at least one thioether group,

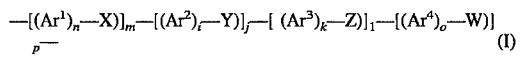

where $Ar^1$, $Ar^2$, $Ar^3$, $Ar^4$, W, X, Y and Z are, independently of one another, identical or different. The indices n, m, i, j, k, 1, o and p are, independently of one another, zero or the integers 1, 2, 3 or 4, their sum having to be at least 2. $Ar^1$, $Ar^2$, $Ar^3$ and $Ar^4$ in the formula (I) are arylene systems having from 6 to 18 carbon atoms. W, X, Y and Z are divalent linking groups selected from among $—SO_2—$, $—S—$, $—SO—$, $—CO—$, $—CO_2—$, alkylene or alkylidene groups having 1–6, preferably from 1 to 4, carbon atoms.

Suitable polymers are, for example, polyarylene thioethers comprising recurring units of the formulae (II)–(VI), the syntheses of which are described, for example, in Chimia 28 (1974), 567:

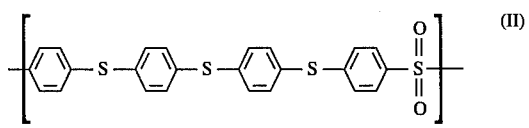

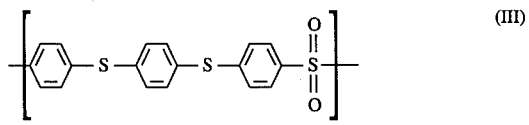

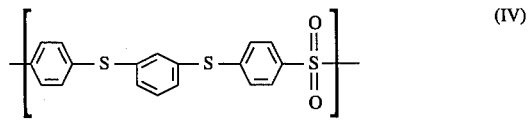

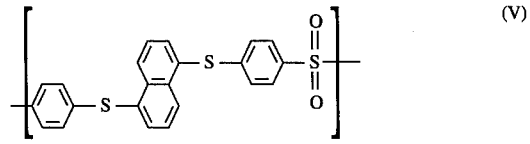

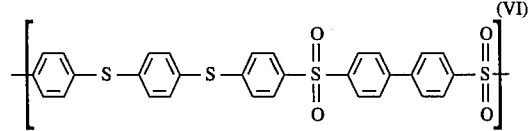

and also polyarylene thioethers comprising recurring units of the formula (VII), which are described, for example, in U.S. Pat. No. 4,016,145.

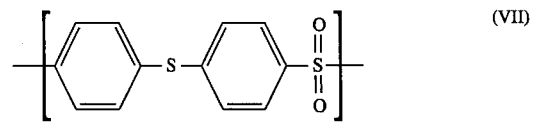

The preferred polyarylene thioether is polyphenylenesulfide (PPS) comprising the recurring unit of the formula (VIII), the preparation process of which is described, for example, in the U.S. Pat. Nos. 3,354,129, 3,919,177, 4,038,262 and 4,282,347.

Polyarylene thioethers suitable for the invention are generally those having an average molecular weight of from 4,000 to 200,000, preferably from 10,000 to 150,000, in particular from 25,000 to 100,000, determined by GPC.

The particle size of the polymers used generally lies in the range from $5\times10^{-6}$ to $300\times10^{-6}$m, preferably from $10\times10^{-6}$ to $300\times10^{-6}$m and in particular from $10\times10^{-6}$ to $200\times10^{-6}$m.

The polyarylene thioethers specified above are converted in solid form in acetic acid, either with hydrogen peroxide using catalytic amounts of concentrated sulfuric acid or with an initial charge of an equilibrium per-acid, into the corresponding polyarylenesulfones. The acetic acid used is preferably glacial acetic acid.

The equilibriumper-acid used can be any organic per-acid soluble in acetic acid. Preference is here given to using the per-acid form of acetic acid, peracetic acid.

Hydrogen peroxide is generally used in the form of its 30% strength aqueous solution. However, higher-percentage oxidants of this type can also be used.

If the reaction is carried out without an initial charge of equilibrium per-acid an addition of a catalytic amount from 0.1 to 10, preferably from 1 to 5%, by volume of concentrated sulfuric acid, based on the amount of acetic acid used, is made.

The reaction takes place at temperatures from 40° to 90° C., preferably from 45° to 65° C., and at the specified conditions. The associated reaction time is from 0.5 to 12 hours, from 1 to 4 hours being preferred. To be certain of decomposing possible residues of peroxide compound, the reaction mixture at the end of the reaction can be briefly heated to temperatures above 90° C., for example up to the boiling point of the reaction mixture.

The polyarylene sulfones obtained according to the invention can either be thermoplastically processed or can be further processed, for example, by customary sintering processes. This depends on the melting points of the polyarylene sulfones obtained. The first group can be converted by processing methods customary for thermoplastics, for example injection molding or extrusion, into molded and functional parts. The molding compositions can also contain known pulverulent fillers such as chalk, talc, clay, mica and/or fibrous reinforcements such as glass and carbon fibers, whiskers, and also further customary additives and processing aids, for example lubricants, mold release compositions, antioxidants, UV stabilizers. Such parts can be used as functional components of which high demands can be made, for example in aircraft and automobile construction and also in the construction of chemical apparatus.

The second group, i.e. the polymers processable by sintering processes, is used in functional parts having high temperature and chemical loading.

In the examples, $T_g$ is the glass transition temperature, $T_m$ is the melting point.

EXAMPLES 1) 5.41 g of polyphenylene sulfide (PPS) powder having an average particle diameter of $20\times10^{-6}$m ($T_g$: 94° C., $T_m$: 287° C.) were initially charged in 20 ml of concentrated acetic acid and admixed at about 50° C. with 29.7 g of 32% strength peracetic acid. After subsequently stirring for 16 hours at about 65° C., the product was filtered off, washed with water and dried.

Yield: 7.1 g=98%.

DSC data: $T_g$: 352° C.; $T_m$: 520° C. (decomposition)

Elemental analysis: calculated C 51.42%, H 2.88%, S 22.87% found C 51.35%, H 2.90%, S 22.75%

2) 833 g of PPS powder as in Example 1 were initially charged in 2.9 l of glacial acetic acid at 55° C., 16 ml of concentrated sulfuric acid were added and 616 g of hydrogen peroxide (87% strength) were added dropwise at constant temperature. After stirring for a further 3 hours at from 58° to 65° C., the reaction solution was cooled and filtered with suction at 50° C., and the product was washed with water and dried.

Yield: 998 g=93%.

DSC data: $T_g$: 352° C.; $T_m$: 520° C. (decomposition)

Elemental analysis: calculated C 51.42%, H 2.88%, O 22.83%, S 22.87% found C 51.39%, H 2.93%, O 22.81%, S 22.86%

We claim:

1. A process for preparing a polyarylene sulfone by oxidizing a polyarylene thioether, which comprises carrying out the reaction a) in acetic acid with hydrogen peroxide in the presence of catalytic amounts of concentrated sulfuric acid and/or b) in acetic acid with addition of equilibrium per-acids.

2. The process as claimed in claim 1, wherein the equilibrium per-acid is peracetic acid.

3. The process as claimed in claim 1, wherein the concentration of sulfuric acid is from 0.1 to 10% by volume, based on the acetic acid.

4. The process as claimed in claim 1, wherein the reaction temperature lies in the range from 40° to 90° C. and the reaction time is from 0.5 to 12 hours.

5. The process as claimed in claim 1, wherein the acetic acid used is concentrated acetic acid.

6. The process as claimed in claim 1, wherein the polyarylene thioether used comprises recurring units of the formula

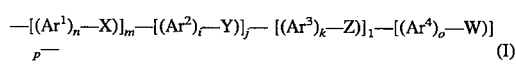

where $Ar^1$, $Ar^2$, $Ar^3$, $Ar^4$, W, X, Y and Z are, independently of one another, identical or different, the indices n, m, i, j, k, l, o and p are, independently of one another, zero or the integers 1, 2, 3 or 4, their sum being at least 2, $Ar^1$, $Ar^2$, $Ar^3$ and $Ar^4$ are arylene systems having from 6 to 18 carbon atoms and W, X, Y and Z are divalent linking groups selected from among —SO$_2$—, —S—, —SO—, —CO—, —CO$_2$—, alkylene or alkylidene groups having 1–6 carbon atoms.

7. The process as claimed in claim 1, wherein the polyarylene thioether used comprises recurring units of the formulae:

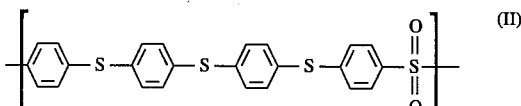

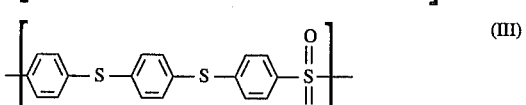

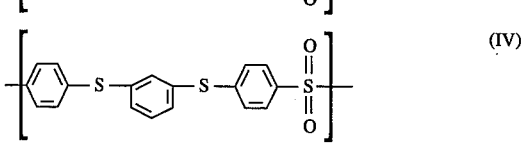

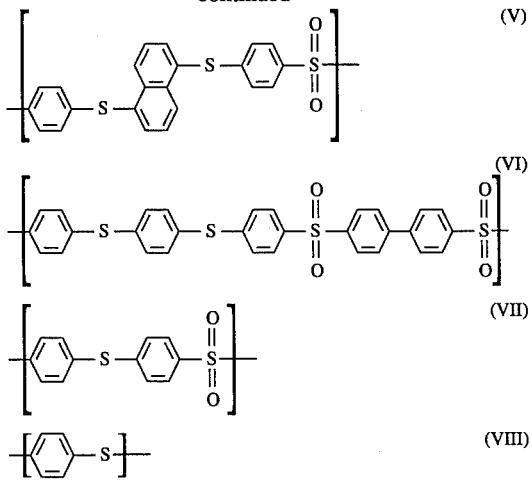

8. The process as claimed in claim 1, wherein a polyphenylene thioether having an average molecular weight of from 4,000 to 200,000 as determined by GPC and an average particle size of from $5 \times 10^{-6}$ to $500 \times 10^{-6}$ m is used.

9. A molded or functional part produced from the polyarylene sulfone obtained by the process as claimed in claim 1.

10. The process as claimed in claim 6, wherein the alkylene or alkylidene groups have from 1 to 4 carbon atoms.

11. The process as claimed in claim 8, wherein the polyphenylene thioether having an average molecular weight of from 10,000 to 150,000, as determined by GPC and an average particle size of from $10 \times 10^{-6}$ to $300 \times 10^{-6}$ m.

12. The process as claimed in claim 8, wherein the polyphenylene thioether having an average molecular weight of from 25,000 to 100,000, as determined by GPC and an average particle size of from $10 \times 10^{-6}$ to $200 \times 10^{-6}$ m.

13. The process as claimed in claim 1, wherein the acidic acid used is glacial acidic acid.

14. The process as claimed in claim 1, wherein the reaction is carried out with an initial charge of equilibrium per-acid and the concentration of sulfuric acid is from 1 to 5% by volume, based on the acetic acid.

15. The process as claimed in claim 4, wherein the reaction temperature lies in the range from 45° to 65° C. and the reaction time is from 1 to 4 hours.

* * * * *